United States Patent [19]

Seki

[11] Patent Number: 5,187,406

[45] Date of Patent: Feb. 16, 1993

[54] VIBRATION DRIVEN MOTOR

[75] Inventor: Hiroyuki Seki, Urawa, Japan

[73] Assignee: Canon Kabushiki Kaisha, Tokyo, Japan

[21] Appl. No.: 750,329

[22] Filed: Aug. 27, 1991

[30] Foreign Application Priority Data

Aug. 28, 1990 [JP] Japan .................. 2-226999

[51] Int. Cl.$^5$ ............................ H01L 41/08
[52] U.S. Cl. ........................... 310/323; 310/328
[58] Field of Search ............................ 310/323, 328

[56] References Cited

U.S. PATENT DOCUMENTS

| 4,562,373 | 12/1985 | Tokusima et al. ........... 310/323 X |
| 4,692,650 | 9/1987 | Okumura et al. ........... 310/323 |
| 4,692,651 | 9/1987 | Hiramatsu et al. ........... 310/323 |
| 4,752,711 | 6/1988 | Tsukimoto et al. ........... 310/323 |
| 4,779,018 | 10/1988 | Okuno et al. ........... 310/323 |
| 4,926,085 | 5/1990 | Sawayama et al. ........... 310/323 |
| 5,013,956 | 5/1991 | Kurozumi et al. ........... 310/323 |

FOREIGN PATENT DOCUMENTS

| 0114481 | 5/1987 | Japan ........... 310/323 |
| 0129783 | 5/1989 | Japan ........... 310/323 |
| 0017873 | 1/1990 | Japan ........... 310/323 |

Primary Examiner—Mark O. Budd
Attorney, Agent, or Firm—Fitzpatrick, Cella, Harper & Scinto

[57] ABSTRACT

A vibration member for a vibration driven motor having a contact member contacting the vibration member, wherein the vibration member generates a vibration in response to an applied electrical signal to create relative movement between the vibration member and the contact member. The vibration member is formed of a sintering material, such as a sintering alloy, having a porosity of 20% or less. The porous vibration member further may include a metal or high molecular compound having a low vibration absorbing property added to the pores of the member by a method of impregnation or infiltration.

14 Claims, 5 Drawing Sheets

| MATERIAL | | Q VALUE | RESONANCE RESISTANCE | RESONANCE FREQUENCY |
|---|---|---|---|---|
| SINTERING MATERIAL | Fe SERIES | 1016 | 557 (Ω) | 27.45 (KHz) |
| | Fe-C SERIES | 915 | 652 (Ω) | 26.43 (KHz) |
| | Fe-Cu-C SERIES | 1025 | 540 (Ω) | 26.65 (KHz) |
| | Cu SERIES | 894 | 733 (Ω) | 19.66 (KHz) |
| | SUS SERIES | 960 | 587 (Ω) | 27.78 (KHz) |
| METAL BY CASTING OR PLASTIC DEFORMATION PROCESS | SUS 420J2 | 1500 | 413 (Ω) | 31.52 (KHz) |

FIG. 3

| MATERIAL | | Q VALUE | RESONANCE RESISTANCE | RESONANCE FREQUENCY |
|---|---|---|---|---|
| SINTERING MATERIAL | Fe SERIES | 1016 | 557 (Ω) | 27.45 (KHz) |
| | Fe-C SERIES | 915 | 652 (Ω) | 26.43 (KHz) |
| | Fe-Cu-C SERIES | 1025 | 540 (Ω) | 26.65 (KHz) |
| | Cu SERIES | 894 | 733 (Ω) | 19.66 (KHz) |
| | SUS SERIES | 960 | 587 (Ω) | 27.78 (KHz) |
| METAL BY CASTING OR PLASTIC DEFORMATION PROCESS | SUS 420J2 | 1500 | 413 (Ω) | 31.52 (KHz) |

VIBRATION DRIVEN MOTOR

BACKGROUND OF THE INVENTION

1. Field of the Invention

This invention relates to a vibration driven motor utilizing the ultrasonic vibration of an electro-mechanical energy conversion element such as a piezo-electric element or an electrostrictive element.

2. Related Background Art

Numerous vibration driven motors utilizing the vibration of the aforementioned conversion element have heretofore been proposed. These prior-art motors are such that as shown, for example, in FIGS. 6 and 7 of the accompanying drawings, a rotor 3 is pressed against a stator comprising a ring-like resilient member 1 and piezo-electric ceramics 2 joined thereto, by a pressing spring 5 through a shaft bar 4. The resilient member 1 is supported by a support plate 7 through a vibration insulating member 6 such as felt. The shaft bar 4 is rotatably supported by a bearing 8, and this shaft bar 4 and the rotor 3 are integrally coupled together and therefore, the rotor 3 can rotate about the shaft bar 4 without contacting the latter. When AC electric fields of two phases which are $\pi/2$ out of phase with each other in time are applied from a driving circuit, not shown, to the piezo-electric ceramics 2 disposed with a spatial phase difference therebetween, a travelling vibration wave is generated in the stator and the rotor 3 is rotated in the direction opposite to the direction of travel of the vibration wave by the frictional force thereof with the stator.

The resilient member 1 has a number of slits 1a formed at equal or unequal intervals on the sliding surface side thereof which is in contact with the rotor 3 to improve the efficiency of the motor. As the material of the resilient member 1 comprising the slits 1a, a base body 1b and projections 1c, use has been made of a metal which is small in the energy loss by vibration (a metal which is small in vibration attenuation), for example, stainless steel, carbon steel, brass, phosphor bronze or the like.

Such a shape and material of the resilient member 1 are considered to be indispensable conditions in designing a vibration driven motor of high performance.

Heretofore, the slits 1a provided in this resilient member 1 have been formed one by one by machining and cutting, and this has led to the problem that the working cost of the resilient member 1 is increased and the cost of the vibration driven motor or actuator is also increased.

In order to solve this problem, it has been proposed to form the resilient member 1 by the forging method. However, this forging method has a limitation in forming the slits 1a with the pitch and depth thereof stabilized, and it has been difficult to form the shape of the slits at a stroke by forging because it is impossible to form the number and depth of slits great enough to maintain the motor performance now demanded and because stainless steel or brass suited for the vibration member is a material unsuited for forging although a material rich in malleability is required in forging.

SUMMARY OF THE INVENTION

It is an object of the present invention to provide a stator of low cost for a vibration driven motor or actuator.

It is another object of the present invention to provide a vibration driven motor or actuator of low cost.

It is still another object of the present invention to provide a rustproof stator of low cost for a vibration driven motor or actuator.

One aspect of the present invention is to form a resilient member by a sintering alloy at a stroke and thereby simplify the working of the resilient member.

The sintering alloy has a density of about 60%–95% and has minute pores in itself and therefore readily attenuates vibration and thus, has been regarded as being unsuited for a vibration member, but it is made usable as a vibration member by making the density thereof during molding exceed 80%, that is, making the porosity thereof into 20% or less, and further infiltrating a metal of small vibration attenuation into the pores in the sintering material to increase efficiency.

BRIEF DESCRIPTION OF THE DRAWINGS

FIGS. 1A, 1B, 2A, 2B, 3 and 4 show the comparison between the vibration characteristics of the sintered materials of the present invention.

DESCRIPTION OF THE PREFERRED EMBODIMENTS

Figure 1A:
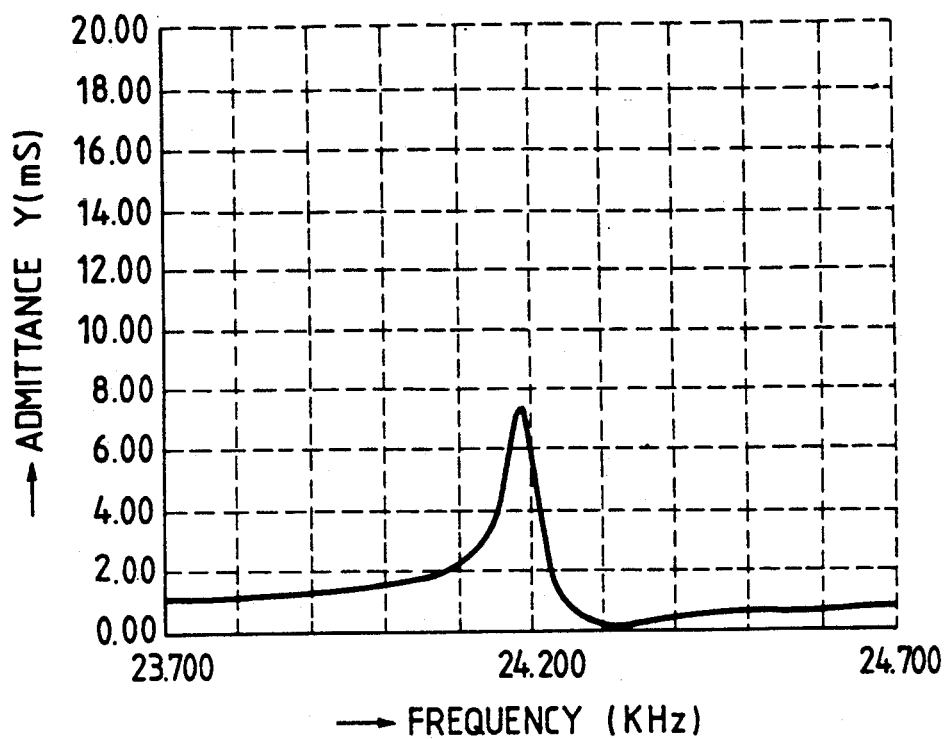
Figure 1B:
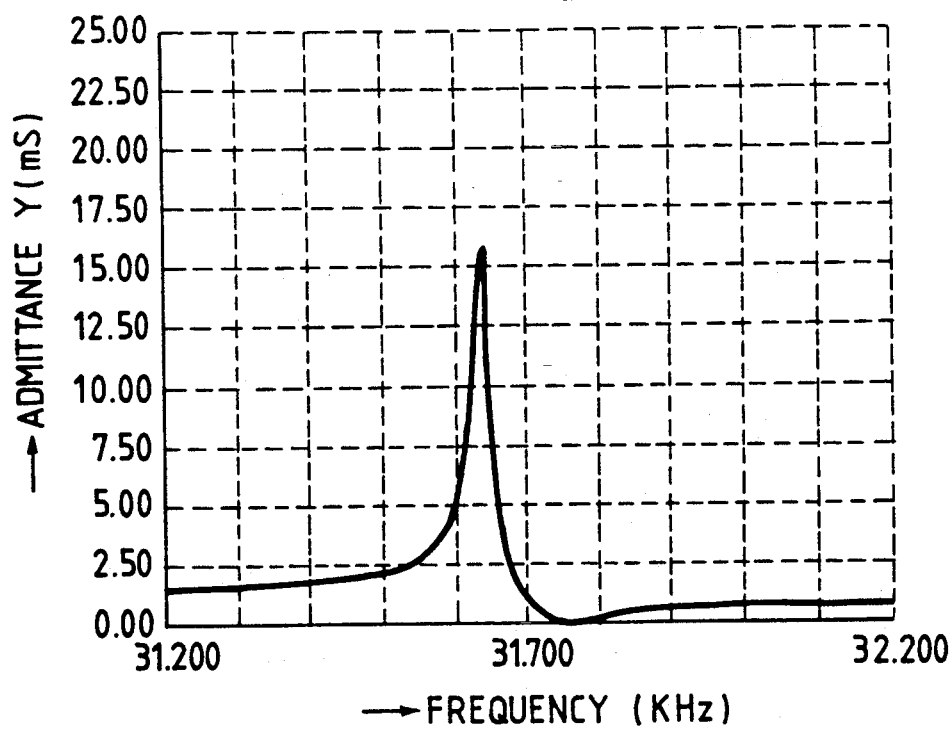
Figure 6:
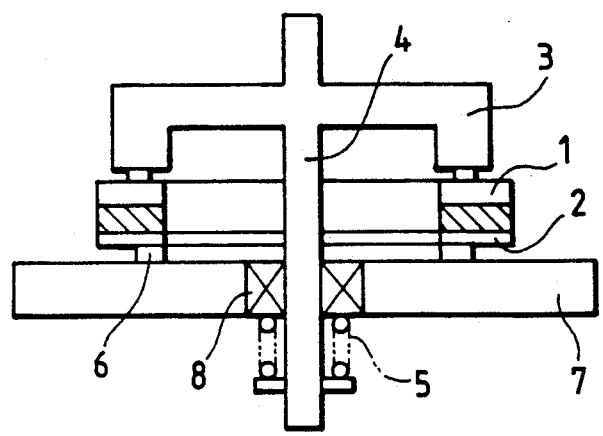
FIGS. 6 and 7 show the structure of a vibration driven motor according to the prior art.
Figure 7:
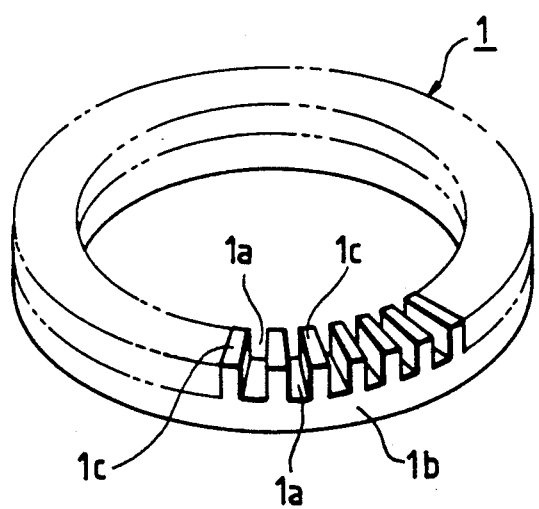

FIGS. 1A and 1B show the result of the comparison between the vibration characteristic of a vibration member (a resilent member to which is secured a piezo-electric element as an electro-mechanical energy conversion element) formed by molding a resilient member 1 (see FIGS. 6 and 7) at a stroke with an iron series sintering material as a sintered alloy and the vibration characteristic of a vibration member formed of the heretofore used material (SUS420J2). The construction and operation of the vibration driven motor (actuator) are the same as those of the vibration driven motor shown in FIGS. 6 and 7 and therefore need not be described. This iron series sintering material is a material consisting of iron (Fe), carbon (C) in an amount in the range of 0.2–1.0% and copper (Cu) in an amount in the range of 1–5%. Also, in order to better the vibration characteristic, porosity is of the order of 10%.

In FIGS. 1A and 1B, the abscissa represent frequency and the ordinate represents the vibration admittance of the vibration member when a predetermined frequency voltage is applied to the piezo-electric element 2, and in this figure, it shows the vibration admittance when a frequency voltage of a frequency in the vicinity of the resonance frequency of the vibration member is applied. For the vibration member 1, 2 (see FIGS. 6 and 7), it is desired that at the resonance point, the amplitude be as great as possible when a predetermined voltage is applied. That is, the vibration admittance is great. Thus, in FIGS. 1A and 1B, it is better that the peak at the resonance point is high.

FIG. 1A shows the characteristic of the vibration member of the present invention formed of a sintering material (Fe series), and FIG. 1B shows the characteristic of a vibration member formed of the conventional material (SUS420J2). As can be seen in FIGS. 1A and 1B, for the vibration member (1, 2) singly, SUS420J2 is better in the vibration characteristic. Also, with regard to the sharpness of resonance, the Q value, the sintering material Q=800 and SUS420J2 Q=1500. Thus, the characteristic of the sintering material is inferior.

However, it is known that when constructed and driven as a motor (or an actuator), the vibration member (1, 2) is pressed by the rotor 3 and its vibration is restrained. Therefore, the Q value becomes lower than in the case of the vibration member (1, 2) singly. That is, even if there is more or less difference in the vibration characteristic in the state of the vibration member (1, 2) singly, whether it is a good vibration member cannot be known unless the motor is driven.

Figure 2A:
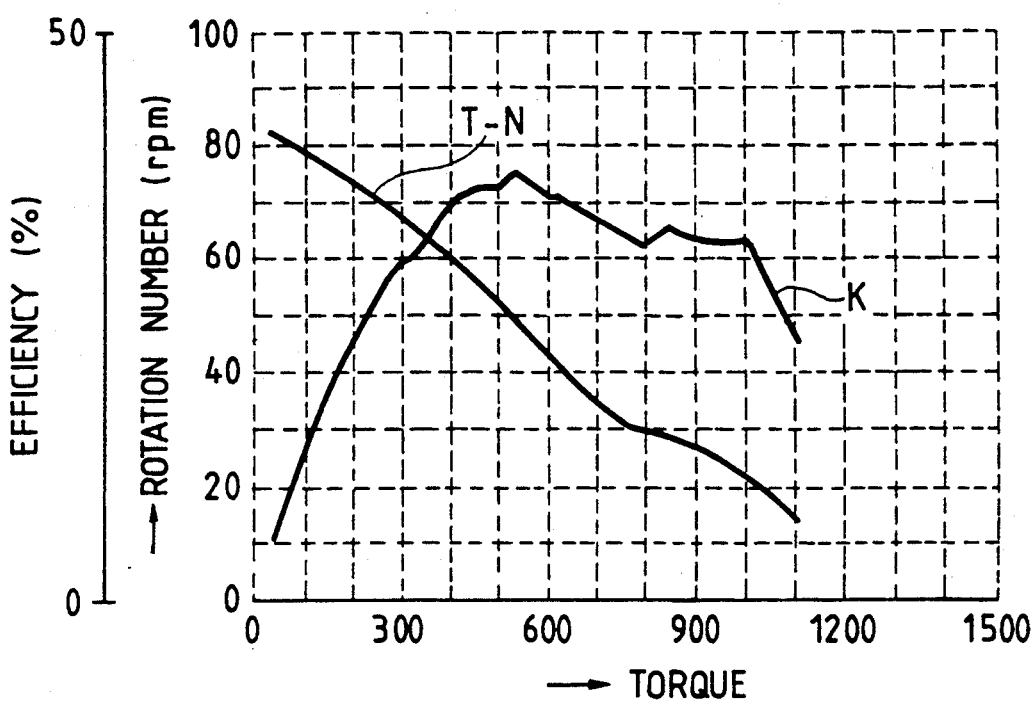
Figure 2B:
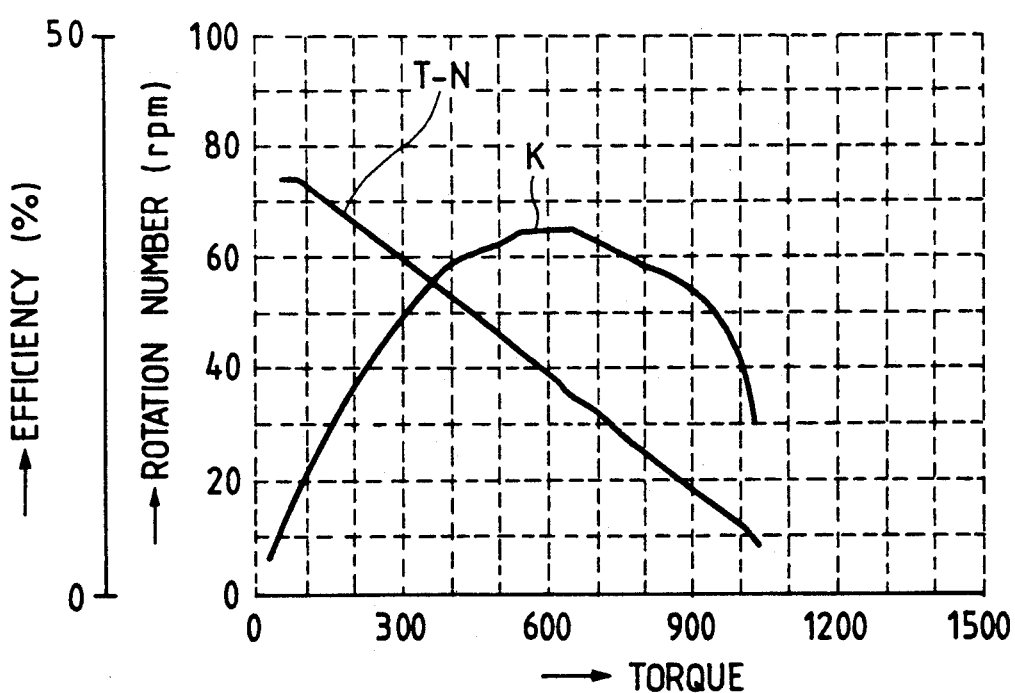

FIGS. 2A and 2B are graphs in which the T-N characteristic (the torque vs. number of revolutions characteristic) of the motor has been judged under the same conditions by the use of vibration members which exhibit the characteristics of FIGS. 1A and 1B. The construction of the vibration driven motor used in the comparison is the same as that shown in FIGS. 6 and 7. As can be seen from FIGS. 2A and 2B, it has been found that in terms of the T-N characteristic (see T-N in the figures) and efficiency (see K in the figures), there is very little difference between the sintering material (see FIG. 2A) and the SUS material (see FIG. 2B) and the resilient member 1 using the sintering material of the present invention as a material and made by molding can be used as a vibration driven motor.

Figure 4:
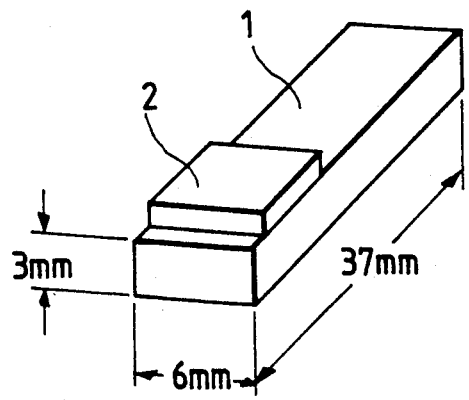

FIG. 3 shows data obtained by measuring the vibration characteristic Q values of test pieces formed of other sintering materials and as shown in FIG. 4, and comparing them with SUS420J2 which is the conventional material. As can be seen from FIG. 3, even iron series), (Fe series, copper series (Cu series) and stainless steel series (SUS series) sintering materials become high in the vibration characteristic Q value by making the porosity 20% or less and increasing the density, and that they can be used as the material of the vibration member (stator).

Embodiment 2

Figure 5:
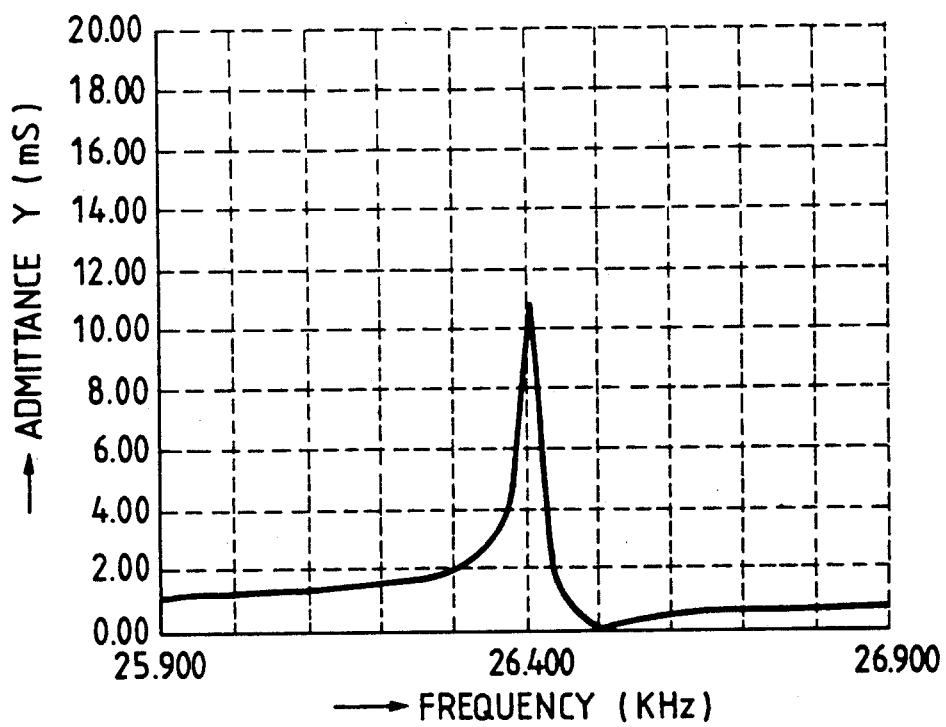
FIG. 5 shows the vibration characteristic of another embodiment.

FIG. 5 shows the vibration characteristic of another embodiment of the present invention in which copper (Cu) is infiltrated into the iron (Fe) series sintering material of FIG. 1A to make the density approximate to 100%.

As can be seen from FIG. 5, this embodiment is improved in the vibration characteristic as compared with that in which a certain kind of material is not infiltrated (see FIG. 1A), and is also improved in the vibration characteristic Q value which amounts to the order of 1,100-1,200.

In the present embodiment, only the data of copper (Cu) is shown as an example of the metal infiltrated, but use may be made of any material low in melting point and small in vibration attenuation, such as zinc, aluminum or silver.

As described above, the resilient member is formed of a sintering material which ensures high working accuracy to be obtained and the porosity of the sintering material is made 20% or less to increase the density of the material so that high efficiency may be obtained, whereby the resilient member is made usable as a stator. Thus, it has become possible to achieve the low cost of the stator working and further the low cost of the vibration driven motor.

By infiltrating or impregnating a metal or a high molecular material into the sintering material, the vibration characteristic is further improved and a contribution is made to the anti-rust effect of iron series sintering materials which readily rust.

I claim:

1. A vibration driven motor comprising:
   a contact member having a contact surface; and
   a vibration member having a surface contacting the contact surface of said contact member, for generating a vibration in response to an applied electrical signal, said vibration causing relative movement between said vibration member and said contact member, wherein said vibration member is formed of a sintering material having a porosity of 20% or less.

2. A vibration driven motor according to claim 1, wherein said sintering material is a sintering alloy having a porosity of 20% or less.

3. A vibration driven motor according to claim 1, wherein said sintering material is a sintering alloy having a porosity of 20% or less, and said vibration member is made by molding.

4. A vibration driven motor according to claim 1, wherein said vibration member contains therein a metal or a high molecular compound having a low vibration absorbing property.

5. A vibration driven motor according to claim 4, wherein said metal or said high molecular compound having a low vibration absorbing property is put into said vibration member by a method of impregnation or infiltration.

6. A vibration driven motor according to claim 4, wherein said metal is copper.

7. A vibration driven motor according to claim 2, wherein said sintering alloy is an iron series sintering material.

8. A vibration driven motor according to claim 7, wherein said iron series sintering material is a mixture of iron with 0.2 to 1.0% carbon and 1 to 5% copper.

9. A vibration driven actuator comprising:
   a contact member having a contact surface;
   a resilient member having a surface contacting the contact surface of said contact member; and
   an electro-mechanical energy conversion member functionally contacting said resilient member for generating a vibration in the resilient member in response to an applied electrical signal, said vibration creating relative movement between said contact member and said resilient member;
   wherein said resilient member is formed of a sintering material having a porosity of 20% or less.

10. A vibration driven actuator according to claim 9, wherein said sintering material is a sintering alloy having a porosity of 20% or less.

11. A vibration driven actuator according to claim 9, wherein said sintering material is a sintering alloy having a porosity of 20% or less, and said resilient member is made by molding.

12. A vibration driven actuator according to claim 9, wherein said resilient member contains therein a metal or a high molecular compound having a low vibration absorbing property.

13. A vibration member for a vibration driven motor having a contact member contacting the vibration member, said vibration member generating a vibration in response to an applied electrical signal, said vibration creating relative movement between said vibration member and said contact member, wherein said vibration member is formed of a sintering material having a porosity of 20% or less.

14. A vibration member according to claim 13, wherein said sintering material is a sintering alloy having a porosity of 20% or less.

* * * * *

UNITED STATES PATENT AND TRADEMARK OFFICE
CERTIFICATE OF CORRECTION

PATENT NO. : 5,187,406
DATED : February 16, 1993
INVENTOR(S) : SEKI

It is certified that error appears in the above-indentified patent and that said Letters Patent is hereby corrected as shown below:

<u>COLUMN 2</u>

Line 48, "represent" should read --represents--.

<u>COLUMN 3</u>

Line 31, "series)," should read --series--; and "series," should read --series),--.
　　Line 42, "approximate to" should read --approximately--.

Signed and Sealed this

Fourteenth Day of December, 1993

Attest:

BRUCE LEHMAN

*Attesting Officer*　　*Commissioner of Patents and Trademarks*